United States Patent [19]
Pedersen

[11] 4,085,916
[45] Apr. 25, 1978

[54] RELEASABLE LOCKING DEVICE

[76] Inventor: Jørgen Gammelgaard Pedersen, Vaegtens Kvarter 4B, DK-2620 Albertslund, Denmark

[21] Appl. No.: 631,664

[22] Filed: Nov. 13, 1975

Related U.S. Application Data

[63] Continuation-in-part of Ser. No. 448,636, Mar. 6, 1974, abandoned.

[51] Int. Cl.² .................................................. F16M 11/16
[52] U.S. Cl. .................................. 248/188; 403/263; 403/332; 403/369
[58] Field of Search ............... 248/188, 321, 335, 336, 248/337, 412; 403/263, 332, 368, 369, 370

[56] References Cited

U.S. PATENT DOCUMENTS

| | | | |
|---|---|---|---|
| 2,010,292 | 8/1935 | Campbell | 403/369 X |
| 2,322,949 | 6/1943 | Lux | 403/263 |
| 2,469,896 | 5/1949 | Schaef | 403/368 X |
| 2,663,584 | 12/1953 | Moran | 403/332 X |
| 2,677,813 | 5/1954 | Sharp | 403/332 X |
| 3,215,974 | 11/1965 | Wooding | 403/369 X |
| 3,319,209 | 5/1967 | Reyenga | 403/370 X |
| 3,687,092 | 8/1972 | Manning | 248/188 X |

FOREIGN PATENT DOCUMENTS

| | | | |
|---|---|---|---|
| 1,370,691 | 10/1974 | United Kingdom | 248/188 |

*Primary Examiner*—William H. Schultz
*Attorney, Agent, or Firm*—Robert E. Burns; Emmanuel J. Lobato; Bruce L. Adams

[57] ABSTRACT

A releasable locking device comprising a first and a second member movable into and out of engagement with each other, and one or more latch elements arranged within an inner space defined by said members when engaged. The latch elements are freely movable in that space which includes an annular channel, under the influence of gravity between a first position in which they do not interfere with movement of said members into and out of engagement with each other, and a second position in which the latch element or elements block movement of said members out of engagement with each other. The said members preferably comprise a socket member having a recess and a tubular stud member receivable therein. Due to the fact that the latch elements are movable under the influence of gravity the position or orientation of the locking device determines whether the latch elements are in their locking or releasing position. The locking device may for example be used for releasably fastening the legs to a piece of furniture and is then preferably adapted so as to have the latch elements in their second or locking position when the piece of furniture is standing upright, whereas the latch elements may be moved to their first or releasing position so that the legs may be separated from the remaining part of the furniture, when the said piece of furniture is inverted to its upside-down position.

13 Claims, 22 Drawing Figures

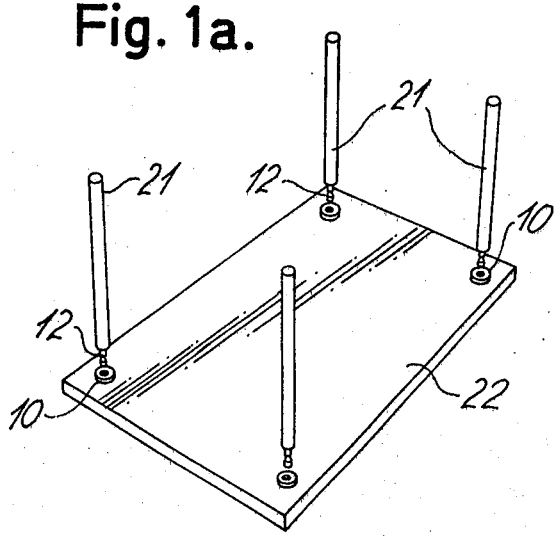
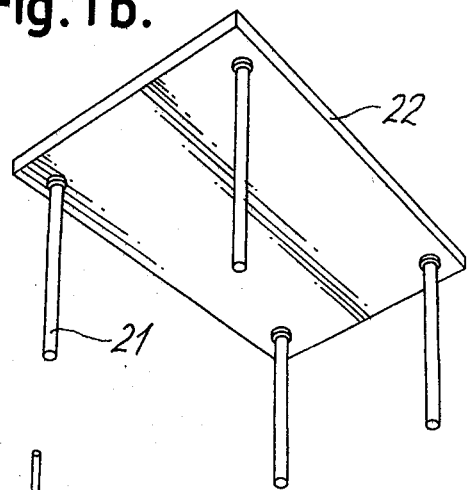
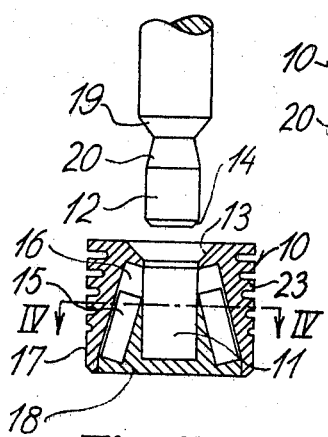
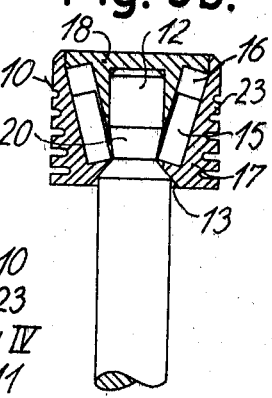
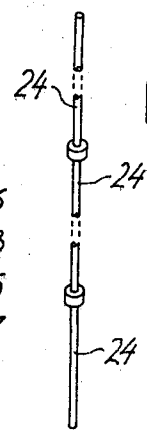
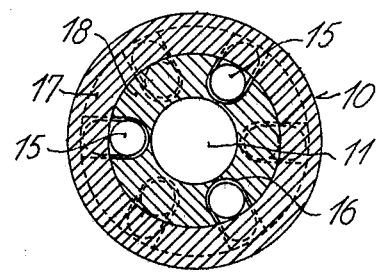
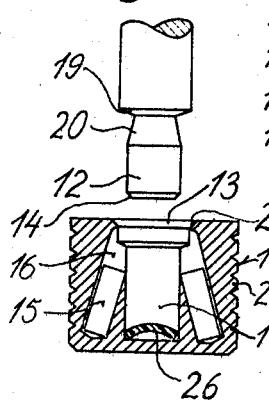
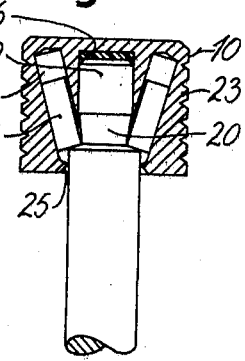
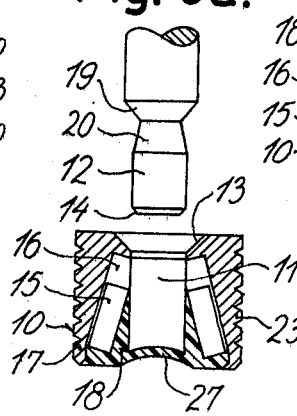
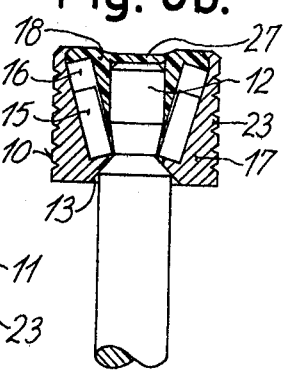

U.S. Patent  April 25, 1978  Sheet 3 of 3  4,085,916
Fig. 12a.
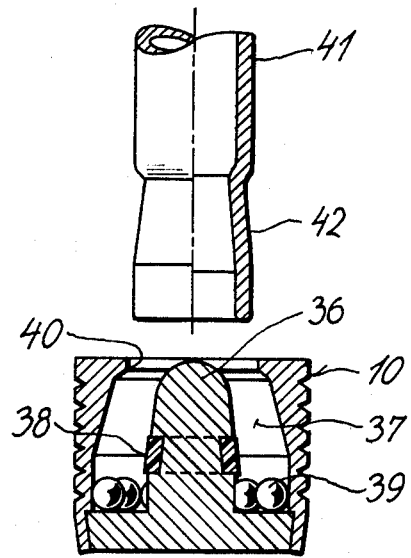
Fig. 12b.
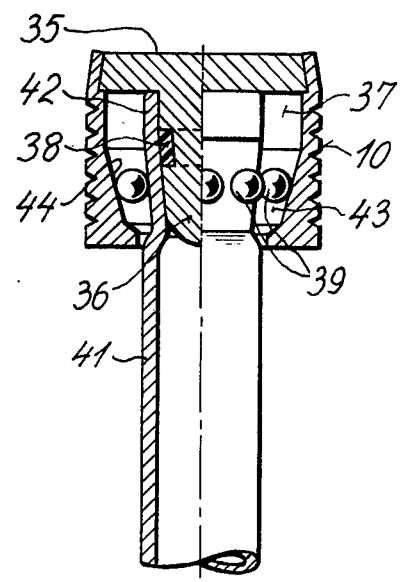
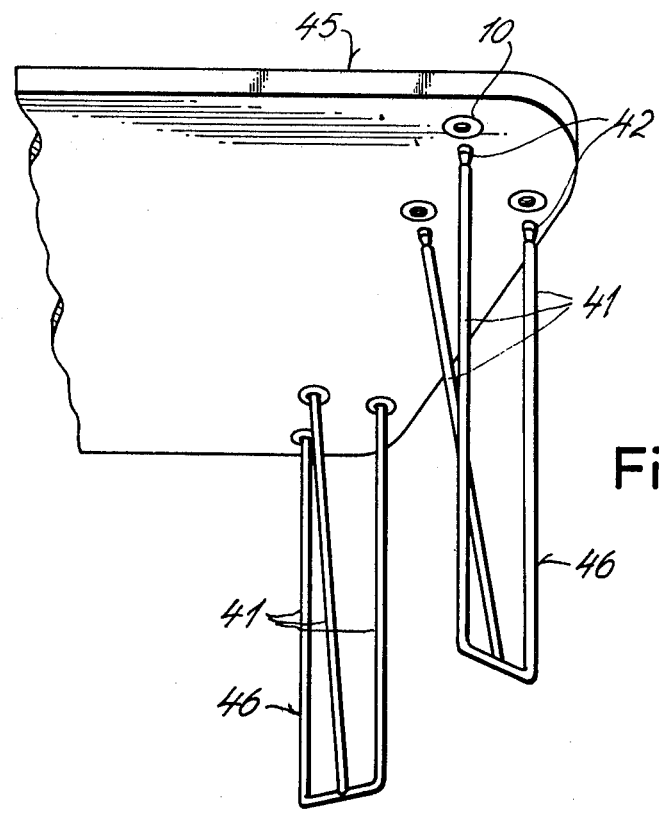
Fig. 13.

RELEASABLE LOCKING DEVICE

CROSS REFERENCE TO RELATED APPLICATIONS

This is a continuation-in-part of Ser. No. 448,636, filed Mar. 6, 1974, now abandoned.

BACKGROUND OF THE INVENTION

1. Field of the Invention

The present invention relates to a releaseable locking device of the type comprising a first member and a second member movable into and out of locking engagement with each other.

2. Description of the Prior Art

A great number of various embodiments of releasable locking devices of that type are commonly known. As an example, each of the members of the locking device may comprise a transverse bore aligned in the engaged position of the members which may then be interlocked by means of a locking pin manually insertable in the aligned bores. The known locking devices also comprise a locking device of the type where the said first and second members may be retained in their engaged position by means of spring biased ball members, and where the said members may be disengaged when subjected to a sufficient tensile force. More specifically, the present invention provides an improvement of a locking device of the type having one or more latch members movable between locking and non-locking positions exclusively under the influence of their own weight, for example as disclosed in U.S. Pat. No. 2,841,847.

SUMMARY OF THE INVENTION

Thus, the present invention provides an improved locking device of the type described having first and second members which in their engaged position may automatically be interlocked and released, respectively, in response to the position or orientation of the locking device or at least one of its members.

The releaseable locking device according to the invention comprises in combination a first socket-like member having a recess and a separate second member having a projecting portion, said members being relatively movable substantially in the axial direction of said projecting portion into and out of a mutually fully engaged position in which said projecting portion of said second member is received in said recess in said first member, said first and second members defining in their fully engaged position an inner space; a latch member arranged within said space and being freely movable therein between locking and releasing positions in which said members are locked by said latch element in their fully engaged position, and a releasing position in which said members may be disengaged, said space including an annular channel surrounding said projecting portion of said second member, and at least partly receiving said latch element in its locking position, said latch element being movable from its releasing position to its locking position and vice versa exclusively by its own weight, whereby said members may be disengaged only in certain positions of the locking device.

The said first and second members may have any shape suitable for proper engagement. Preferably, the said first member comprises a socket-like member having a recess and said second member comprises a stud receiveable in said recess, which may have any suitable form. The latch element may for example be of cylindrical shape or of any other elongated shape with a circular or non-circular cross-section. In some embodiments, however, the latch element is preferably ball-shaped.

A preferred embodiment of the releaseable locking device according to the invention comprises a first socket-like member having an annular slot or recess and a tapered centrally projecting stud forming the inner wall of said annular slot, at least one latch element arranged freely movable within said slot, a second member having a projecting tubular portion with an outer surface part diverging towards the free end of said projecting portion, said members being relatively movable into and out of a mutually fully engaged position, in which said stud is received in said tubular projecting portion, an annular space defined between said diverging outer surface parts of said tubular portion and the radially oppositely located inner wall parts of said socket-like member, said annular space having a maximum radial width exceeding the maximum radial dimension of said latch element, and a minimum radial width at a location closer to the opening of said recess and being smaller than said maximum dimension of the latch element. Preferably, the annular slot or recess contains a plurality of latch elements — preferably ball-shaped elements — sufficient to substantially occupy the said annular space when the locking device is in its locked position.

The locking device according to the invention may advantageously be used for interlocking any parts or structural elements which should be interlocked when placed in a certain position or in certain positions, whereas the interlocking should be released when said parts or structural elements are placed in another predetermined position or other positions. As an example, the locking device according to the invention may advantageously be used for connecting legs or similar support members to apparatuses, containers, pieces of furniture, etc. The locking device may then be constructed so as to have the latch element or elements in ther locking position when the associated body (apparatus, container, piece of furniture, etc.) is in its position for normal use and so as to have the latch element or elements in their releasing position when the associated body has been inverted or moved to any other position different from that of normal device according to the invention may also be constructed in such a manner that the members of the locking device may be interlocked and released, respectively, by a rotational movement about a common longitudinal axis of said members or at least one of them.

BRIEF DESCRIPTION OF THE DRAWINGS

The invention will now be further explained with reference to the accompanying drawings, wherein FIG. 1a is a perspective view of an inverted table having legs each connectable to the table top by means of a locking device according to the invention, FIG. 1b is a perspective bottom view of the table shown in FIG. 1a in its upright position, FIG. 2 is rod sections interconnected by means of locking devices according to the invention, FIG. 3a is a side and partially sectional view of a first embodiment of the locking device according to the invention in its released position and shown in enlarged scale, FIG. 3b is the locking device shown in FIG. 3a in its locked position, FIG. 4 is a sectional view as indicated by IV—IV in FIG. 3a in an enlarged scale, FIG. 5a is a side and partially sectional view of a second embodiment of the locking device in its released position, FIG. 5b is the locking device according to FIG. 5a in its locked position, FIG. 6a is a side and partially secitional view of a third embodiment of the locking device in its released position, FIG. 6b is the embodiment shown in FIG. 6a in its locked position, FIG. 12a is an eighth embodiment of the locking device according to the invention in its unlocked position, FIG. 12b is the embodiment shown in FIG. 12a in its locked position, and FIG. 13 is a perspective view of part of a table having legs connectable by means of locking devices, for example of the type shown in FIG. 12.

DESCRIPTION OF THE PREFERRED EMBODIMENTS

Figures 7A, 7B:
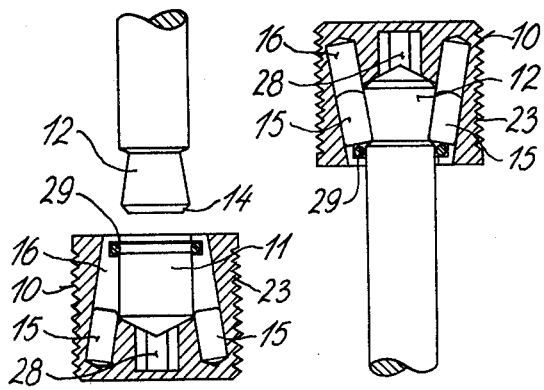
FIG. 7a is a side and partially sectional view of a fourth embodiment of the locking device according to the invention.
FIG. 7b is the embodiment shown in FIG. 7a in its locked position.
Figure 8:
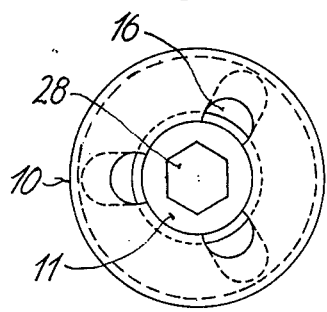
FIG. 8 is a bottom view of the socket member shown in FIGS. 7a and 7b in an enlarged scale.

FIGS. 3-11 show various embodiments of locking devices according to the invention each comprising a socket member 10 having an axial recess or bore 11 and a stud member 12 receiveable in said recess with a slip or loose fit. In order to facilitate insertion of the stud member 12 in the recess 11 the recess may have a converging opening portion 13, and the adjacent end portion of the stud member may be bevelled at 14.

Each of the locking devices shown in the drawings comprises one or more latch members or elements 15. In the embodiment shown in the drawings the latch members 15 are substantially cylindrical members each of which are received in a corresponding pocket or bore 16 with a fit enabling the latch members 15 to move from one end of the bores 16 to the other exclusively under the influence of gravitation.

In the embodiment shown in FIGS. 3a, 3b, and 4 the socket member 10 defines a number of pockets or bores 16 angularly spaced around and opening into the recess 11. The said pockets or bores converge towards the opening of the recess 11. The socket member 10 which may be made of plastic, metal, or any other suitable material has an outer part 17 and a separately formed inner part 18 mounted therein. The socket member 10 may for example contain three uniformly spaced pockets or bores 15 as indicated with solid lines in FIG. 4 or six pockets or bores (also those indicated by broken lines). Each latch member 15 which is preferably made of metal, such as steel, or of a suitable plastic material, has a substantially shorter length than the corresponding pocket or bore 16 so that in the position shown in FIG. 3a they do not project into the cylindrical recess 11 and thus do not interfere with insertion of the stud member 12 in that recess. The stud member 12 has an undercut portion defined by conical surface parts 19 and 20. If the stud member 12 is inserted in the recess 11 of the socket member 10 placed as shown in FIG. 3a and the locking device is subsequently moved to the position shown in FIG. 3b the latch members 15 will slide down to the opposite end of the pockets or bores 16 under the influence of gravitation, and thus the outer free end portion of each latch member will project into the recess 11 and engage with the conical surface part 20 as shown in FIG. 3b. In that position the latch members 15 interlock the socket member 10 and the stud member 12 and prevent separation of the said members. If the locking device is inverted once more the gravitational pull will move the latch members 15 back to the inner ends of the pockets or bores 16 and the members 10 and 12 may then be separated.

The locking device according to the invention may for example be used for mounting legs 21 to a table top 22 as shown in FIG. 1a and 1b. The socket member 10 may then be embedded in the table top, and for that purpose the outer cylindrical surface of the socket member may be provided with screw threads or friction increasing means 23. A stud member 12 is formed or mounted on one end of each leg 21. It is understood that when the table is placed in its inverted position shown in FIG. 1a the stud members 12 on the legs 21 may be engaged with the socket members 10 in the table top 22, and when the table is turned to its normal position of use the legs 21 will automatically be locked to the table top 22.

FIG. 2 shows a number of rod sections 24 each provided with a stud member 12 at one end and a socket member 10 at the other. It is understood that the rod sections 24 may be engaged and disengaged in a certain substantially vertical position whereas separation of the rod sections is prevented when they are oppositely orientated, i.e. have been turned approximately 180°.

In the embodiment shown in FIGS. 5a and 5b the socket member 10 is an integral part preferably made from metal. The bores 16 receiving the latch members 15 may be made by drilling, and after insertion of the latch members 15 the edge of each bore has been deformed at 25 so as to prevent the latch members 15 from falling out of the bores. A curved spring member 26 arranged at the inner end of the recess 11 is being compressed when the stud member 12 is inserted in said recess. Thus, the spring member 26 tends to separate the members 10 and 12 and thereby maintain the conical surface part 20 of the stud member 12 in tight engagement with the latch members 15 in the locked position as shown in FIG. 5b.

In the embodiment shown in FIGS. 6a and 6b the socket member 10 also comprises an outer part 17 and an inner part 18 just like the embodiment shown in FIGS. 3a and 3b. In FIGS. 6a and 6b, however, the outer part 17 is preferably made from metal whereas the inner part 18 is made of plastic and has an inwardly curved, resilient central portion 27 having substantially the same function as the spring member 26 in FIGS. 5a and 5b.

In the embodiment shown in FIGS. 7a and 7b the socket member 10 is formed integrally for example of metal or plastic material. The recess 11 in the socket member 12 comprises an inner recess 28 which may for example have a square or hexagonal cross section. The inner recess 28 is intended for receiving an end portion of a spanner or wrench by means of which the socket member 10 may be screwed into a bore which may be provided with internal threads adapted to engage with the screw threads 23 on the outer surface of the socket member. Alternatively, the thread 23 may be of the self-tapping type. The socket member 12 has a conical outer surface corresponding to the conical surface part 20 in the embodiment previously described. However, in the embodiment shown in FIG. 7a and 7b the conical surface part extends right up to the bevelled surface part 14. A locking ring 29 positioned in an annular groove in the socket member 10 retains the latch members 15 in their respective bores 16. The longitudinal axis of the latch members 15 defines an imaginary conical surface having an apical angle corresponding substantially to that of the conical outer surface of the stud member 12. Therefore, when the locking device is in its locked position as shown in FIG. 7b the cylindrical latch members 15 engage the outer surface of the stud member 12 along substantially the whole length thereof and thereby lateral and tilting movement of the stud member 12 in relation to the socket member 10 is effectively prevented without using a cylindrical guiding surface as that used in the previous embodiment.

Figures 9A, 9B:
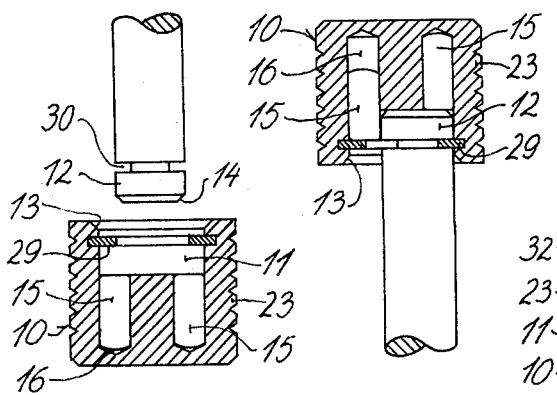
FIG. 9a is a side and partially sectional view of a fifth embodiment of the locking device according to the invention in its released position.
FIG. 9b is the locking device shown in FIG. 9a in its locked position.

In the embodiment shown in FIGS. 9a and 9b the pockets or bores 16 are arranged angularly spaced along the peripheral inner wall of the recess 11 and extend in an axial direction from the end wall of that recess. The stud member 12 has a cylindrical outer surface with an annular slot 30 formed therein. When the stud member 12 has been inserted in the recess 11 it may be moved transversely to an eccentric position in which part of the locking ring 29 is received in the annular slot 30 whereby axial movement of the stud member 12 out of engagement with the socket member 10 is prevented. If the locking device is orientated as indicated in FIG. 9b at least one of the latch members 15 may under the influence of gravitation fall down to a locking position in which the outer end surface of the latch member abuts the locking ring 29. The end portion of the latch member 15 projecting into the recess 11 between the inner wall of the recess and the outer circumferential surface of the stud member retains the locking ring 29 in engagement with the annular slot 30. If, however, the locking device is placed in the position shown in FIG. 9a all of the latch members 15 will fall back to a position in which they are fully received in the bores 16, and the stud member 12 may now be moved to a substantially central position and separated from the socket member 10. It should be understood that an alternative embodiment may have an annular slot for receiving the latch members or elements 15 instead of the bores 16. Thus, in FIG. 9 the bores 16 may be considered a section in such an annular space.

Figures 10A, 10B:
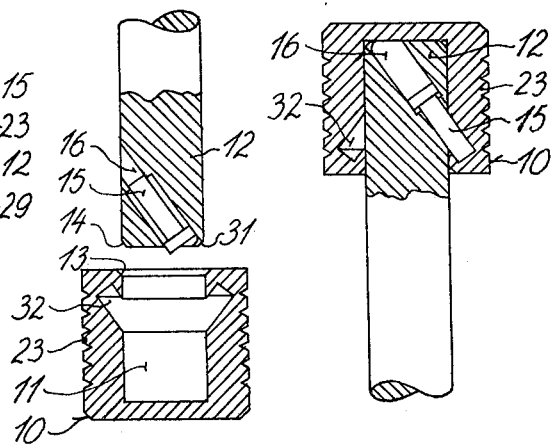
FIG. 10a is a side view and partially sectional view of a sixth embodiment of the locking device according to the invention in its released position.
FIG. 10b is the locking device shown in FIG. 10a in its locked position.

The embodiment shown in FIGS. 10a and 10b includes a single latch member 15 which is received in a pocket or bore 16 formed in a substantially cylindrical stud member 12 and extending in a direction inclined in relation to the longitudinal axis of the stud member. The bore 16 opens into the end surface and cylindrical side surface, respectively, of the stud member 12, and the edge of the bore opening in said end surface is deformed at 31 so as to prevent the latch member from falling out of the bore. The recess 11 in the socket member 10 comprises an inner annular slot 32. When the locking device is orientated as shown in FIG. 10a the latch member 15 is substantially totally received in the bore 16 so that the stud member may be moved into and out of engagement with the socket member 10, as desired. If, however, the locking device is moved to the position shown in FIG. 10b and the stud and socket members are in engagement with each other the latch member will slide to its locking position shown in FIG. 10b under the influence of gravitation. In that position one end portion of the latch member projects downwardly into the slot or groove 32 and thereby prevents separation of the stud member 12 and the socket member 10. The extent to which the latch member 15 may project from the side surface of the stud member 12 is limited by a flange formed at the opposite end of the latch member and engageable with a corresponding annular shoulder within the bore 16.

Figure 11A:
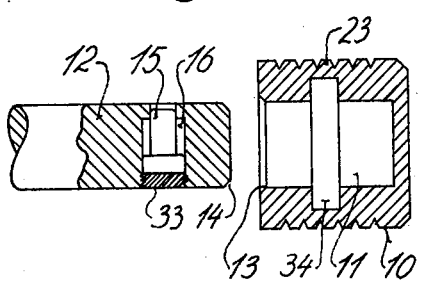
FIG. 11a is a seventh embodiment of the locking device according to the invention shown in its released position.
Figure 11B:
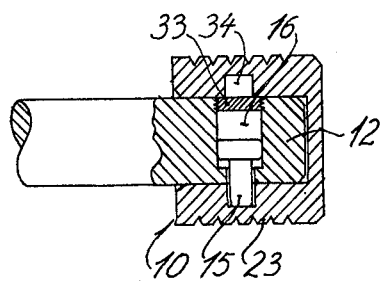
FIG. 11b is the embodiment shown in FIG. 11a in its locked position.

In the embodiment shown in FIGS. 11a and 11b the latch member 15 is also received in a bore formed in the stud member 12. However, the bore 16 extends diametrically and is closed at one end by means of a threaded plug 33. When the stud member 12 is received in the socket member 10 the end portion of the latch member 15 may engage with an annular, radially extending slot or groove 34. When the stud member 12 is arranged with the opening of the bore 16 facing upwardly as shown in FIG. 11a the stud and socket members may be moved into and out of engagement with each other. If, however, the stud member 12 is moved into engagement with the socket member 10 and subsequently rotated approximately 180° so that the opening of the bore 16 is facing downwardly the gravitational pull will move the latch member 15 into engagement with the slot or groove 34 as shown in FIG. 11b and axial movement of the stud member 12 in relation to the socket member 10 will be blocked. The locking device may, however, be released by merely rotating the stud member 12 approximately 180°.

FIG. 12 shows an embodiment wherein the socket member 10 has a separately made end wall 35 connected to the cylindrical wall of the socket member in any suitable manner. A projection or stud 36 extends from the end wall 35 axially into the socket member recess so as to define an annular slot or recess 37 within the socket member. The free end portion of the projection 36 has a substantially conical outer surface and is provided with friction increasing means which may, for example, have the form of a slit, resiliently deformable ring 38 received in a circumferentially extending groove or channel in the stud member. The annular slot 37 contains one or more latch members or elements preferably in the form of steel balls 39 having a diameter exceeding the spacing between the edge 40 surrounding the opening of the slot 37 and the adjacent surface part of the stud member 36 so that the balls 39 will be retained within the slot or recess 37. In FIG. 12 the socket 10 cooperates with a tubular member 41 which may for example form part of a table leg. The tubular member 41 has a free end 42 with a diverging wall part and adapted to receive the projection or stud 36 therein when inserted in the recess 37.

FIG. 12a shows the socket member 10 in an inverted position in which the balls 39 are resting on the inner surface of the end wall 35 so that they do not prevent insertion of the free end 42 of the tubular member 41 in the recess 37. When the tubular member 41 has been fully engaged with the socket member 10 the locking device may be turned to the position shown in FIG. 12b. The balls 39 will then by their own weight fall down into an annular channel 43 defined between the outer diverging wall part of the free end 42 of the tubular member 41 and the radially opposite, conical inner wall part 44 of the socket member 10. These opposite wall parts preferably converge at an angle of about 15°–20° whereby the balls 39 will become jammed between the opposite surfaces to a suitable extent preventing disengagement of the members 10 and 41 unless the locking device has been turned to the position shown in FIG. 12a.

FIG. 13 shows part of a table 45 having legs 46 each having three upright tubular members 41. The free ends 42 of the tubular members 41 may be inserted into socket members 10 which at spaced locations are embedded in the underside of the table top.

It should be understood that numerous modifications and changes of the embodiments described above may be made within the scope of the appended claims. For example, the stud member 12 may have a spherical shape. When locking devices of the last mentioned type are used for fastening legs to a table top or another body, it may be advantageously to connect each leg by means of three mutually spaced locking devices in order to obtain a satisfactory stability. As mentioned above, the locking device according to the invention may be used to connect any other structural elements. Furthermore, it should be understood that the latch members may have any other cross section and any other suitable shape than that shown and described, for example ball shape. The interengageable main elements of the locking device need not be of the stud and socket type, but may for example be similar to the engaging elements of a claw clutch. However, it is important that the latch member or members are moved between their locking and releasing positions exclusively under the influence of gravitational forces, so that the latch members are in their locking position or releasing position dependent on the position or orientation of the locking device or its main elements.

I claim:

1. A releasable locking device comprising in combination:
   a first socket-like member having a recess and a separate second member having a projecting portion, said members being relatively movable substantially in the axial direction of said projecting portion into and out of a mutually fully engaged position in which said projecting portion of said second member is received in said recess in said first member, said first member having a stud portion arranged centrally within said recess and extending towards the opening thereof and said projecting portion of said second member having at its free end a pocket or bore for receiving said stud member in the fully engaged position of said first and second members and having an outer surface part diverging towards the free end of said projecting portion and defining together with a radially oppositely located inner wall part of said recess of said first member an annular channel section having a radial width decreasing in the direction towards the opening of the recess in said first member from a maximum width to a minimum width,
   at least one latch element arranged within said channel section, the maximum radial dimension of the latch element receivable in said channel section being greater than said minimum width and smaller than said maximum width of the channel section, said latch element being freely movable in said channel section between locking and releasing positions in which said members are locked by said latch element in their fully engaged position and in which said members may be disengaged, respectively, said latch element being movable from its releasing position to its locking position and vice versa exclusively by its own weight, whereby said members may be disengaged only in certain positions of the locking device.

2. A releasable locking device according to claim 1, wherein said recess of said first member has an opening which is smaller than an inner part of said recess.

3. A releasable locking device according to claim 2, wherein said stud has a reduced outer end portion.

4. A releaseable locking device according to claim 1, wherein said projecting portion is a tubular portion.

5. A releaseable locking device according to claim 4, wherein said recess contains a plurality of ball-shaped latch elements.

6. A releaseable locking device according to claim 5, wherein said ball-shaped latch elements are made from steel, said diverging outer surface part of said second member and said oppositely located inner wall part of said socket-like member converging at an angle of about 15°–20°.

7. A releaseable locking device according to claim 1, wherein said stud portion comprises friction increasing means for increasing the friction between the stud portion and said projecting portion engaging therewith.

8. A releaseable locking device according to claim 1, wherein one of said members is connected to a body part of a piece of furniture, the other of said members being connected to a leg for said piece of furniture.

9. A releasable locking device comprising in combination:
   a first socket-like member having an annular slot or recess and a tapered centrally projecting stud forming the inner wall of said annular slot,
   at least one latch element arranged freely movable within said slot,
   a second member including a projecting tubular portion having an outer surface part diverging towards the free end of said projecting portion, said members being relatively movable into and out of a mutually fully engaged position in which said stud is received in said tubular projecting portion, an annular space being defined between said diverging outer surface parts of said tubular portion and the radially oppositely located inner wall part of said socket-like member, said annular space having a maximum radial width exceeding the maximum radial dimension of said latch element, and a minimum radial width at a location closer to the opening of said recess and being smaller than said maximum dimension of the latch element.

10. A releaseable locking device according to claim 9, wherein said annular slot or recess contains a plurality of latch elements.

11. A releaseable locking device according to claim 10, wherein said latch elements are ball-shaped.

12. A releaseable locking device according to claim 11, wherein said ball-shaped latch elements are made from steel, the opposite surface parts defining said annular space converging at an angle of about 15°–20°.

13. A releaseable locking device according to claim 12, wherein said stud comprises friction increasing means for increasing the friction between the stud and said projecting tubular portion engaging therewith.

* * * * *